United States Patent [19]

Ochiai

[11] Patent Number: 4,709,200
[45] Date of Patent: Nov. 24, 1987

[54] POWER SOURCE CIRCUIT

[75] Inventor: Hitoshi Ochiai, Tokyo, Japan

[73] Assignee: Seiko Instruments & Electronics Ltd., Tokyo, Japan

[21] Appl. No.: 789,611

[22] Filed: Oct. 21, 1985
(Under 37 CFR 1.47)

[51] Int. Cl.$^4$ .............................................. H02J 9/00
[52] U.S. Cl. ......................................... 320/1; 307/64; 323/906
[58] Field of Search ................... 320/1; 368/203, 204, 368/205; 323/222, 242, 906; 307/64

[56] References Cited

U.S. PATENT DOCUMENTS

| | | | |
|---|---|---|---|
| 3,594,627 | 7/1971 | Lesher | 320/21 |
| 4,434,395 | 2/1984 | Higuchi | 320/1 |
| 4,504,896 | 3/1985 | Easter et al. | 323/222 X |

Primary Examiner—R. J. Hickey
Attorney, Agent, or Firm—Bruce L. Adams; Van C. Wilks

[57] ABSTRACT

A power source circuit has an electric energy generator, two condensers, a switching element and a voltage detecting circuit. The first condenser accumulates electric energy which is generated by the electric energy generator, such as a solar cell, and the second condenser supplies electric energy to a load. The switching element controls the electric energy transfer from the first condenser to the second condenser in response to the output of the voltage detecting circuit which detects the terminal voltage of the second condenser. The first condenser has a relatively high withstand voltage and relatively small capacity and volume so as to obtain a quick start-up operation of the circuit and a prolonged operation.

14 Claims, 15 Drawing Figures

POWER SOURCE CIRCUIT

BACKGROUND OF THE INVENTION

1. Field of the Invention

This invention relates to a power source which uses the energy accumulated temporarily and stably in a condenser, the accumulated energy being fed from a primary power source such as a solar cell the output of which is unstable.

2. Description of the Prior Art

Conventionally, a condenser $C_S$ and a load 3 are connected in parallel with a power source as shown in FIG. 2. By setting the capacitance of the condenser $C_S$ relatively large, the power source voltage $V_L$ applied to a load and a predetermined operation time after the load 3 stops receiving the electric charge from the power source 1 are stabilized. A reverse current preventive element 2 is connected between the power source 1 and the condenser $C_S$, if necessary.

The above mentioned power source circuit is disclosed in U.S. Pat. No. 4,434,395 issued Feb. 28, 1984 to Higuchi. It has been disadvantageous that the utilization ratio of the accumulated charges is very low, even if the capacitance of the condenser $C_S$ is increased above the range of the power source voltage $V_L$ effective to operate the load 3 normally, that is, the range from the lowest voltage limit $V_{OPL}$ to the highest voltage limit $V_{OPH}$. The normal operation of the load is not executed in the case that the power source voltage $V_L$ is below the voltage $V_{OPL}$. The drawback in utilization is that the accmulated electric charges are not used below the voltage $V_{OPL}$. The accumulated electric charges not used as mentioned above are indicated by the oblique lines as shown in FIG. 3. Generally, the condenser has the relation that the capacitance is in inverse proportion to the withstand voltage in the constant cubic volume.

SUMMARY OF THE INVENTION

Accordingly, it is an object of this invention to provide a power source circuit for enhancing greatly the utilization ratio of the accumulated electronic charges in a condenser.

It is another object of this invention to provide a power source circuit comprising a power source, first condenser connected in parrallel with the power source, a switching element and a load each connected in series with the first condenser, a second condenser and a voltage divider each connected to the load, and detecting circuit means connected in parallel with the load for controlling ON and OFF operation of the switching element in response to an output of the voltage divider.

According to this invention, the electric charges from the power source are accumulated in the first condenser of the high withstand voltage to be high voltage.

Next, the second condenser of a relatively small capacity and the voltage divider of the power source are connected to the load which is connected to the detecting circuit means having hysteresis input-output characteristic relative to the power source voltage applied to the load.

The power source voltage is fed through the switching element controlled ON and OFF by the first condenser and the output of the detecting circuit means to the load.

Even after the power source stops producing an electric charge, since the first condenser how been charged in the vicinity of the high withstand voltage, the load is operated till the charged voltage of the first condenser falls below the predetermined voltage.

As the electric charges are taken out of the first condenser, the utilization ratio of the accumulated charges becomes great as compared with the conventional one.

DESCRIPTION OF THE PREFERRED EMBODIMENTS

The embodiment of this invention will be described hereinafter in conjunction with the drawings.

Figure 1:
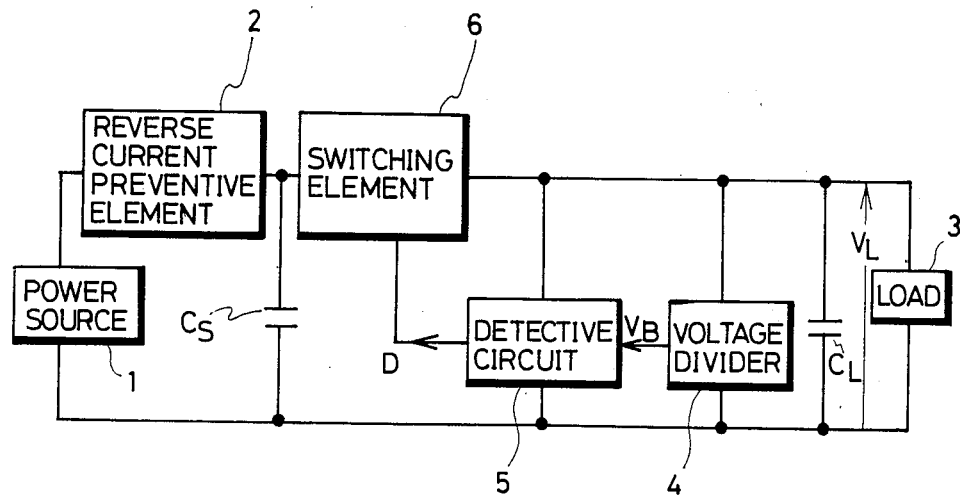
FIGS. 1 and 13 are block diagrams of a power source according to this invention.
Figure 2:
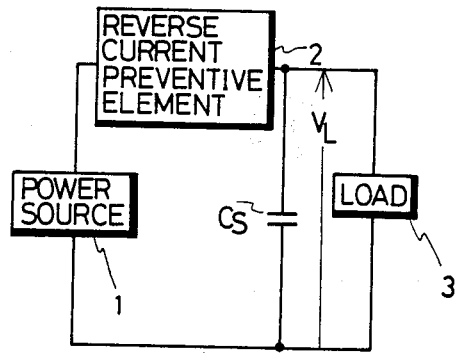
FIGS. 2 and 3 are a block diagram of a conventional power source and a characteristic graph showing the utilization ratio of the electric charge stored in the first condenser $C_S$, respectively.

In FIG. 1, an unstable output power source 1 generates electric charge to charge a first condenser or capacitor $C_S$ up to the vicinity of the withstand voltage $V_{CH}$ of the first condenser $C_S$ despite the existence of a reverse current preventive element 2 such as a diode and is connected through a switching element 6 controlled ON and OFF by an output control signal D from a detecting circuit 5 to a load 3 which receives the electric charges from the first condenser $C_S$. The apparatus further comprises a second condenser or capacitor $C_L$ of a relatively small capacity connected in parallel with the load 3 for receiving the electric charge from the first condenser $C_S$ to develop the power voltage $V_L$ across a pair of terminals thereof, a voltage divider 4 for dividing the power source voltage $V_L$ which is applied to the load 3, and the detecting circuit 5 having hysteresis input-output characteristics relative to the power source voltage $V_L$ which is divided by the voltage divider 4 to the output voltage $V_B$.

As mentioned above, the utilization ratio of the accumulated electric charges in the first condenser $C_S$ is enhanced by extracting the electric charges from the first condenser $C_S$ with the switching element 6.

Figure 3:
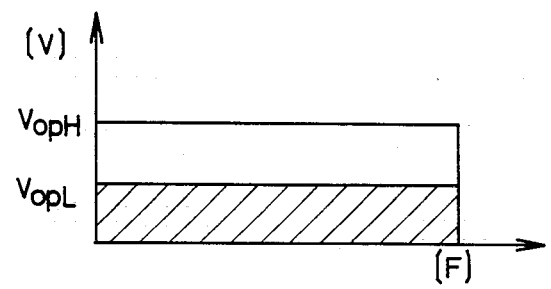
Figure 4:
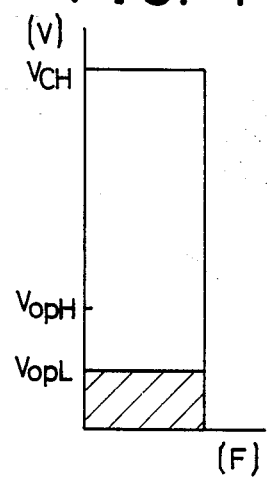
FIG. 4 is a characteristic graph showing the utilization ratio of the electric charge stored in the first condenser $C_S$.

This state is explained in FIG. 4 in comparison with FIG. 3. The above fact means that the operation maintaining time extends broadly as compared with the conventional one.

Figure 5:
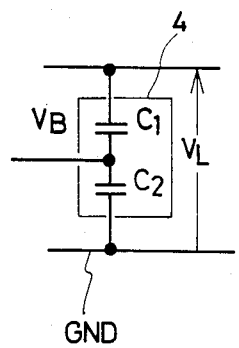
FIGS. 5 and 11 show embodiments of the voltage divider 4.

FIG. 5 is an embodiment of the voltage divider 4 which is composed of two condensers $C_1$ and $C_2$.

In the case that the divided voltage $V_B$ is measured relative to the ground voltage $V_{SS}$ or $V_{DD}$, the divided voltage B is represented as follows:

$$V_B = \frac{C_1}{C_1 + C_2} V_L \ [V]$$

Figure 6:
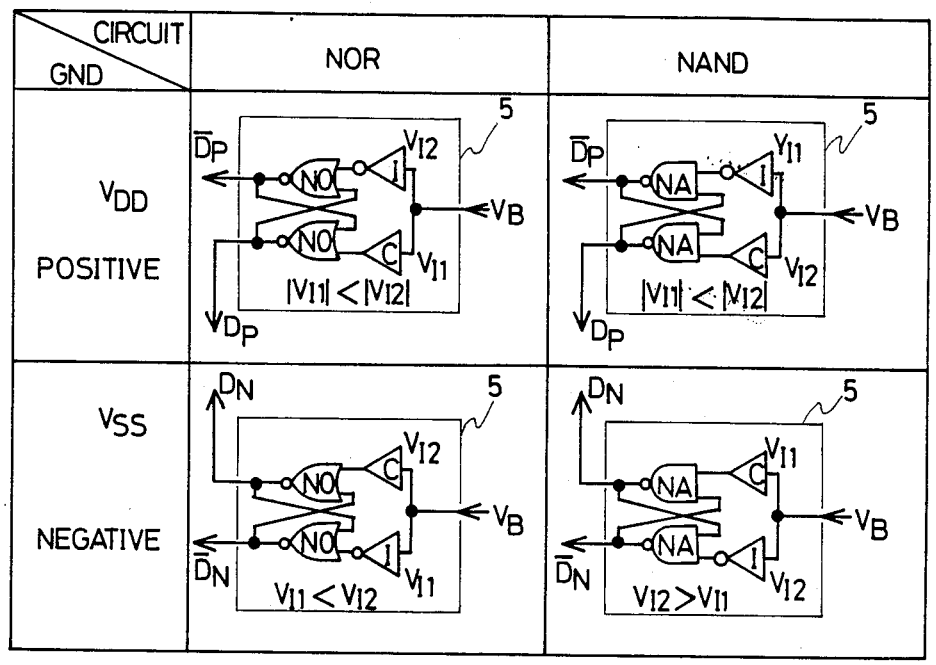
FIGS. 6 and 12 show embodiments of the detecting circuit 5.

FIG. 6 shows four embodiments of the detecting circuit 5 having the hysteresis input output characteristic relative to the power source voltage $V_{DD} - V_{SS} = V_L$ or $V_{SS} - V_{DD} = V_L$ proportional to the divided voltage $V_B$.

The ground level is designated by $V_{DD}$ or $V_{SS}$. Four kinds of RS flipflop are constructed by a NOR circuit NO and a NAND circuit NA.

I designates an inverter and C designates a converter.

The converter C is constructed by two serial-connected inverters.

Accordingly, the inverted voltage of the inverter I and the converted voltage of the converter C are of voltage values $V_{I1}$ and $V_{I2}$.

The high and low relation of the voltages is represented by $V_{I1} < V_{I2}$ or $|V_{I1}| < |V_{I2}|$.

Each of $D_N$, $\overline{D}_N$, $D_P$ and $\overline{D}_P$ is an output control signal.

The inverted voltage of the inverter I and the converted voltage of the converter C are determined by the well-known technology, for example, the threshold voltage of the transistor fabricated in the ion injection process and K value determined by the channel length and width.

Figure 7:
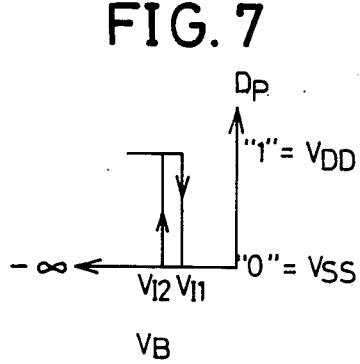
FIGS. 7 and 8 are graphs showing input and output characteristics of hysteresis of the detecting circuit 5.

FIG. 7 is an example showing the hysteresis input and output characteristic between the divided voltage $V_B$ serving as the input signal of the detecting circuit 5 and the output control signal $D_P$ thereof where the ground of the embodiment circuit according to this invention is connected to the terminal of the positive voltage $V_{DD}$.

Figure 8:
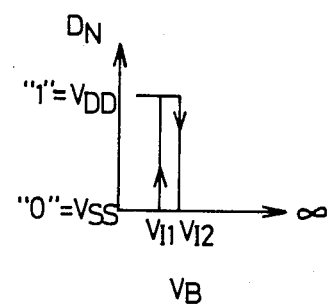

FIG. 8 is an example showing the hysteresis input and output characteristic of the detecting circuit 5 where the ground of the circuit is connected to the terminal of the negative voltage $V_{DD}$ and the input signal and output control signal of the detecting circuit 5 are $V_B$ and $D_N$, respectively, as shown in FIG. 8. When the input voltage $V_B$ representative of the power voltage $V_L$ falls below the predetermined value $V_{I1}$, the detecting circuit 5 produces a control signal $D_N$ of level "1". When the input voltage $V_B$ exceeds the other predetermined value $V_{I2}$ larger than $V_{I1}$, the detecting circuit 5 produces another control signal $D_N$ of level "0".

Figure 9:
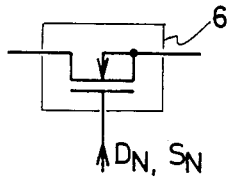
FIGS. 9 and 10 are diagrams showing embodiments of the switch element 6.
Figure 10:
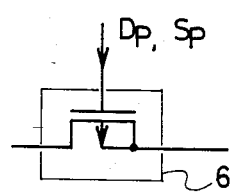

FIGS. 9 and 10 show embodiments of the switching element 6 which is a transistor capable of operating at least in the depletion mode. As shown in FIG. 9, when the control signal $D_N$ of logic "1" is applied to the switching transistor 6, the switching transistor 6 is maintained electrically conductive or ON to effect the transfer of the electric charge from the first capacitor $C_S$ to the second capacitor $C_L$ to thereby recover the voltage $V_B$ above the predetermined value $V_{I1}$. When the control signal $D_N$ of logic "0" is applied to the switching transistor 6, the switching transistor 6 is maintained electrically non-conductive of OFF to suspend the transfer of the electric charge from the first capacitor $C_S$ to the second capacitor $C_L$ to thereby reduce the voltage $V_B$ below the other predetermined value $V_{I2}$.

The initial operation of the embodiment of this invention and the starting and maintaining of the normal operation thereof are ensured in the case that the ground is connected to the negative voltage terminal or connected to the positive voltage terminal.

Figure 11:
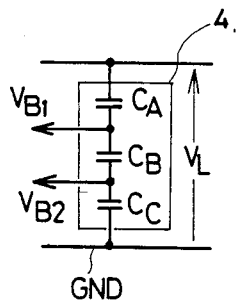

FIG. 11 is en embodiment of the voltage divider 4 which is constructed by the serial connection of a condenser $C_A$, a condenser $C_B$ and a condenser $C_C$.

The voltages $V_{B1}$ and $V_{B2}$ of the voltage divider are represented by the following equations:

$$V_{B1} = V_L / \left[ 1 + 1/C_A \left( \frac{1}{C_B} + \frac{1}{C_C} \right) \right] \ [V]$$

$$V_{B2} = V_{B1} / \left( 1 + \frac{C_C}{C_B} \right) \ [V]$$

Where $V_L > V_{B1} > V_{B2}$ or $V_L < V_{B1} < V_{B2}$.

The capacitances of the condensers $C_A$ and $C_C$ are determined by introducing the numerals into $V_L$, $V_{B1}$, $V_{B2}$ and $C_B$.

Figure 12:
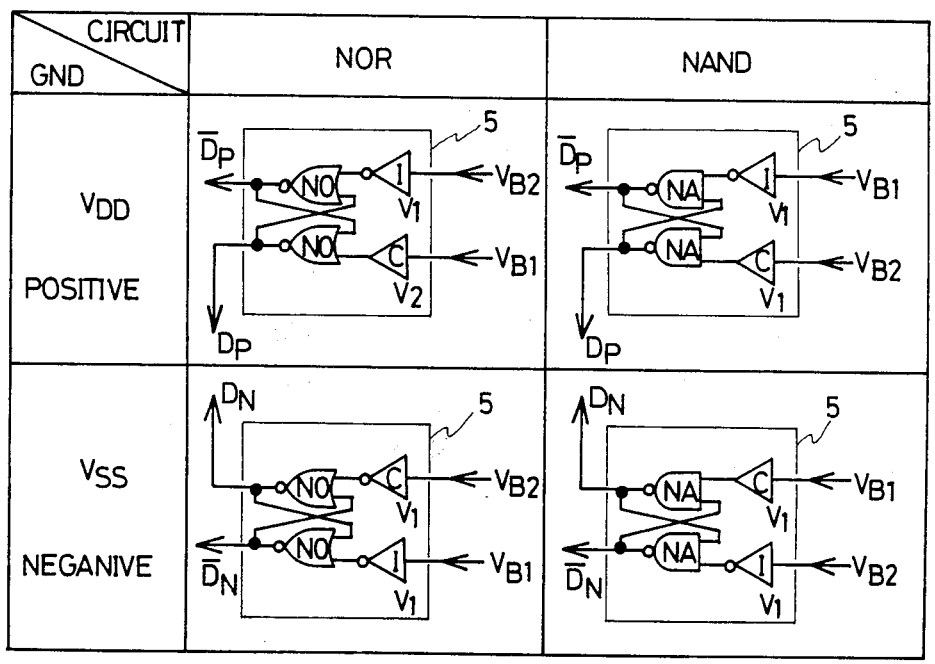

FIG. 12 is another embodiment of the detecting circuit 5 for using together with the voltage divider 4.

The detecting circuit has four kinds of different construction.

The inverted voltage $V_I$ of the inverter I and the converted voltage $V_I$ of the converter C is fabricated to be equal to each other with using the same well-known technology as shown in FIG. 6, and the input-output characteristic is the same as that in FIG. 6.

Figure 13:
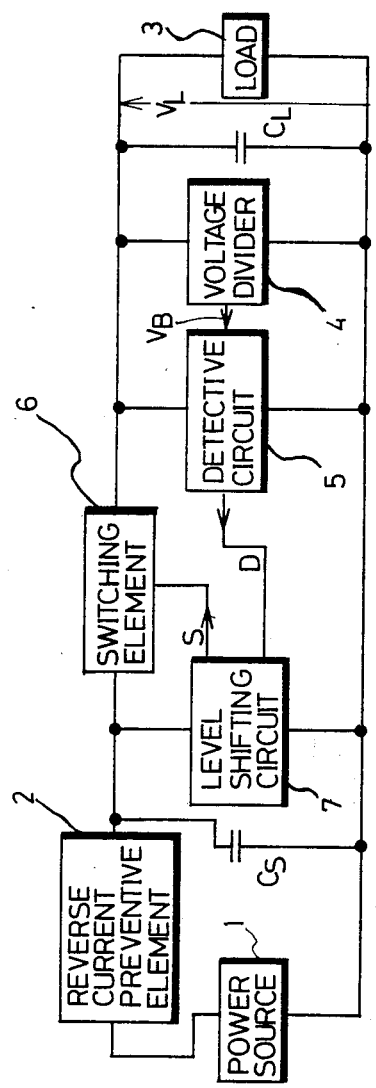

FIG. 13 is a power source circuit composed of the power source circuit in FIG. 1 and a level shifting circuit 7.

The level shifting circuit 7 connected in parallel with the first condenser $C_S$ shifts or boosts the output signal D fed from the detecting circuit 5 to produce a signal S of a higher voltage so that the switching element 6 is controlled ON and OFF by the signal S.

In the above mentioned construction, the driving capability of the switching element 6 at the ON time is possible to be greater than that as shown in FIG. 1, in the case that the switching element 6 as shown particularly in FIGS. 9 and 10 is an insulated type field effect transistor.

As a result, the above mentioned construction is applied to a heavy load.

Figure 15:
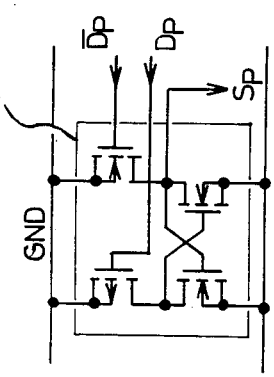
FIGS. 14 and 15 are diagrams showing embodiments of the level shifting circuit 7.
Figure 14:
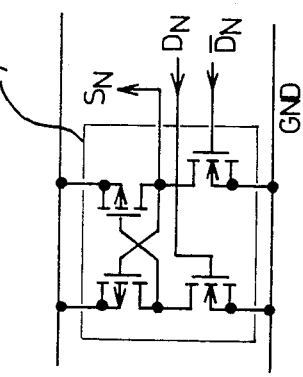

FIGS. 14 and 15 show an embodiment of the level shifting ciruit 7 having the ground connected to the negative voltage $V_{SS}$ terminal and an embodiment of the level shifting circuit 7 having the ground connected to the positive voltage $V_{DD}$ terminal, respectively.

The output signals $S_N$ and $S_P$ of the high voltage are outputted from the level shifting circuits in response to the output signals $D_N$ and $\overline{D}_N$ from the detecting ciruit 5 of FIG. 6, and the output signals $D_P$ and $\overline{D}_P$ from the detective circuit 5 of FIG. 12, respectively.

In the above mentioned embodiments, the first condenser $C_S$ is charged to a high voltage rapidly so that the time from the starting to the normal operation of the load 3 is shortened in case that the first condenser has a higher withstand voltage and a smaller capacity as compared with the conventional one on the condition that is has a constant volume.

The utilization ratio of the accumulated electric charge bcomes high because the accumulated electric charge is kept in the high charged voltage.

Thereby, the normal operation keeping time of the load 3 is prolonged effectively even in the case that the first condenser is not charged by the power source 1.

The power source circuit according to this invention as mentioned above is the circuit system which charges the electric charges form the power source which is unstable at the output thereof to the condenser of small capacity, high withstand voltage and small volume, so that the starting operation maybe quick and operation keeping time may be longer.

If the power source circuit is applied to a clock, the clock will have high accuracy, be possible to set the voltage range of the operation power source and have a power source free of the battery containing mercury which has the possibility of the environmental contamination.

What is claimed is:

1. A power source circuit comprising:
    a power source for generating electric energy;
    a first condenser connected in parallel with said power source for receiving therefrom the electric energy;
    a second condenser for supplying electric energy to a load connected in parallel with said second condenser;
    a switching element connected in series with said first condenser and said second condenser for controlling the electric energy transfer from said first condenser to said second condenser; and
    detecting circuit means for detecting a terminal voltage level of said second condenser and for controlling the ON and OFF operation of said switching element in response to the detecting result of said terminal voltage level of said second condenser to enable said switching element to effect the electric energy transfer to thereby maintain the terminal voltage level within a predetermined range.

2. A power source circuit as claimed in claim 1; wherein said power source comprises a solar cell.

3. A power source circuit as claimed in claim 1; wherein said first condenser has a withstand voltage several times higher than the normal operating voltage effective to operate said load.

4. A power source circuit as claimed in claim 1; wherein said switching element comprises a depletion type field effect transistor.

5. A power source circuit as claimed in claim 1; further comprising a level shifting ciruit responsive to an output of said detecting circuit means for controlling said switching element, and said switching element comprising a field effect transistor operative to undergo two mode operation of depletion and enhancement.

6. A power source circuit as claimed in claim 1; wherein said detecting circuit means comprises a voltage divider for dividing the terminal voltage of said second condenser, an inverter and a converter, each for receiving an output of the voltage divider, and a RS flipflop having two NOR circuits or two NAND circuits which are inputted with an output signal of said inverter and said converter so that the detecting circuit means has a hysteresis in the input-output characteristic thereof.

7. A power supply apparatus for supplying a power voltage to a load, comprising: a power source for generating electric charge; a first capacitor connected to the power source for receiving therefrom and storing the generated electric charge; a second capacitor having a pair of terminals and connected to the first capacitor for receiving therefrom the stored electric charge to thereby develop a power voltage across the pair of terminals; detecting means for detecting the power voltage to produce a control signal when the detected power voltage falls below a predetermined value due to discharging of the second capacitor; and switching means connected between the first and second capacitors and maintained electrically conductive in response to the control signal to effect the transfer of the electric charge from the first capacitor to the second capacitor to thereby recover the power voltage above the predetermined value.

8. A power supply apparatus as claimed in claim 7; wherein the power source comprises a solar cell.

9. A power supply apparatus as claimed in claim 7; wherein the first capacitor has a withstand voltage larger than the power voltage.

10. A power supply apparatus as claimed in claim 7; wherein the detecting means includes means operative when the detected power voltage exceeds another predetermined voltage higher than the first-mentioned predetermined voltage due to charging of the second capacitor for producing another control signal effective to maintain the switching means electrically non-conductive to thereby suspend the transfer of the electric charge from the first capacitor to the second capacitor to thereby reduce the power voltage below said another predetermined value.

11. A power supply apparatus as claimed in claim 7; wherein the detecting means includes a voltage divider for dividing the power voltage by a given factor to produce a divided voltage, and a detecting circuit for detecting the divided voltage.

12. A power supply apparatus as claimed in claim 7; including shifting means connected between the detecting means and the switching means for shifting the level of the control signal to adjust the same relative to the switching means.

13. A power supply apparatus as claimed in claim 12; wherein the switching means comprises a field effect transistor operative in depletion and enhancement modes.

14. A power supply apparatus as claimed in claim 7; wherein the switching means comprises a depletion type field effect transistor.

* * * * *